United States Patent
Catalano et al.

(10) Patent No.: US 10,299,008 B1
(45) Date of Patent: May 21, 2019

(54) SMART CLOSED CAPTION POSITIONING SYSTEM FOR VIDEO CONTENT

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy O. Tsfasman, Wappingers Falls, NY (US); John S. Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/818,807

(22) Filed: Nov. 21, 2017

(51) Int. Cl.
| | |
|---|---|
| *H04N 21/488* | (2011.01) |
| *G06K 9/00* | (2006.01) |
| *G10L 15/26* | (2006.01) |
| *G10L 21/10* | (2013.01) |
| *G06K 9/62* | (2006.01) |

(Continued)

(52) U.S. Cl.
CPC ....... H04N 21/4884 (2013.01); G06F 17/214 (2013.01); G06F 17/2785 (2013.01); G06K 9/00288 (2013.01); G06K 9/00744 (2013.01); G06K 9/6215 (2013.01); G10L 15/265 (2013.01); G10L 21/10 (2013.01); H04N 21/4394 (2013.01); H04N 21/44008 (2013.01)

(58) Field of Classification Search
CPC ........... H04N 21/4884; H04N 21/4394; H04N 21/44008; G06F 17/214; G06F 17/2785; G06K 9/00288; G06K 9/00744; G06K 9/6215
See application file for complete search history.

(56) References Cited

U.S. PATENT DOCUMENTS

| | | | |
|---|---|---|---|
| 8,878,913 B2 | 11/2014 | Eyer | |
| 9,652,683 B2 | 5/2017 | Ramnani et al. | |

(Continued)

OTHER PUBLICATIONS

Disclosed Anonymously "Automated Video Creation Using Audio and Video Components Extracted From Videos Based on a Received Script for the Video" ip.com; IP.com No. IPCOM000237079D; Publication Date: May 29, 2014; 18 pgs.

(Continued)

*Primary Examiner* — Mishawn N Hunter
(74) *Attorney, Agent, or Firm* — Cantor Colburn LLP; Teddi Maranzano

(57) ABSTRACT

Embodiments of the present invention provide a computer-implemented method for generating closed captions via optimal positioning and character specific output styles. The method includes receiving a video input. The method generates closed caption data from the video input based at least in part on extracting text data from an audio portion of the video input. For each given frame of the video input that has closed caption data associated with the given frame, one or more characters who are speaking in the given frame are identified via facial recognition and audio tone matching. A respective text style for each given character that uniquely identifies the given character from the one or more identified characters is obtained. Captioning in the respective text style of each of the one or more identified characters is generated. The generated captioning is then inserted into the given frame.

17 Claims, 6 Drawing Sheets

(51) Int. Cl.
*G06F 17/21* (2006.01)
*H04N 21/439* (2011.01)
*H04N 21/44* (2011.01)
*G06F 17/27* (2006.01)

(56) References Cited

U.S. PATENT DOCUMENTS

| | | | |
|---|---|---|---|
| 9,696,881 | B2 | 7/2017 | Pornprasitsakul et al. |
| 2005/0058435 | A1 | 3/2005 | Chung et al. |
| 2009/0060452 | A1 | 3/2009 | Chaudhri |
| 2009/0278986 | A1* | 11/2009 | Ikegami ............... G11B 27/034 348/564 |
| 2011/0222782 | A1* | 9/2011 | Kashiwagi ......... G06K 9/00711 382/218 |
| 2011/0242104 | A1* | 10/2011 | Zhang ................. H04N 13/183 345/419 |
| 2014/0046661 | A1* | 2/2014 | Bruner ............... H04N 21/4884 704/235 |
| 2016/0062995 | A1* | 3/2016 | Ng .................... G06F 17/30044 707/723 |
| 2016/0371556 | A1* | 12/2016 | Ramnani ................ G06T 5/005 |
| 2018/0199080 | A1* | 7/2018 | Jackson, Jr. ..... H04N 21/23424 |

OTHER PUBLICATIONS

Disclosed Anonymously "Method and System of Closed-Caption-based News Video Segmentation based on Error-tolerant Features" ip.com; IP.com No. IPCOM000208676D; Publication Date: Jul. 15, 2011; 5 pgs.

Disclosed Anonymously "Optimizing Text Placement and Color Scheme for Video" ip.com; IP.com No. IPCOM000221949D; Publication Date: Sep. 17, 2012; 3 pgs.

Mell, Peter et al., "The NIST Definition of Cloud Computing Recommendations of the National Institute of Standards and Technology", National Institute of Standards and Technology; Special Publication No. 800-145; Sep. 2011; 7 pgs.

* cited by examiner

SMART CLOSED CAPTION POSITIONING SYSTEM FOR VIDEO CONTENT

BACKGROUND

The present invention generally relates to video analysis, and more specifically, to smart closed caption systems for appearance and positioning of closed caption text in video content.

Closed captioning is a process of displaying text on a visual screen to provide additional or interpretative information, such as sound effects, relevant musical cues, and other relevant audio information. Some typical implementations include the construction of subtitles for creating translations of dialog in a foreign language.

The phrase "machine learning" broadly describes a function of an electronic system that learns from data. A machine learning system, engine, or module can include a trainable machine learning algorithm that can be trained, such as in an external cloud environment, to learn functional relationships between inputs and outputs that are currently unknown.

SUMMARY

Embodiments of the present invention provide a computer-implemented method for generating closed captions via optimal positioning and audio source (e.g., specific character, background sounds, etc.) output styles. A non-limiting example of the computer-implemented method includes receiving a video input. The method includes generating closed caption data from the video input, in which the closed caption data is generated based at least in part on extracting text data from an audio portion of the video input. For each given frame of the video input in which closed caption data was generated, one or more characters who are speaking in the given frame or additional audio sources are identified via facial recognition and audio tone matching. A respective text style for each given character or audio source that uniquely identifies the given character or audio source from the one or more identified characters or audio sources is obtained. Captioning from the closed caption data for each of the one or more identified characters or audio sources in the respective text style of each of the one or more identified characters or audio sources is generated. The generated captioning is then inserted into the given frame.

Embodiments of the present invention are directed to a system for generating closed captions via optimal positioning and audio source output styles. A non-limiting example of the system includes one or more processors configured to perform a method. A non-limiting example of the computer-implemented method includes receiving a video input. The method includes generating closed caption data from the video input, in which the closed caption data is generated based at least in part on extracting text data from an audio portion of the video input. For each given frame of the video input in which closed caption data was generated, one or more characters who are speaking in the given frame or additional audio sources are identified via facial recognition and audio tone matching. A respective text style for each given character or audio source that uniquely identifies the given character or audio source from the one or more identified characters or audio sources is obtained. Captioning from the closed caption data for each of the one or more identified characters or audio sources in the respective text style of each of the one or more identified characters or audio sources is generated. The generated captioning is then inserted into the given frame.

Embodiments of the invention are directed to a computer program product for generating closed captions via optimal positioning and audio source output styles, the computer program product comprising a computer readable storage medium having program instructions embodied therewith. The program instructions are executable by a processor to cause the processor to perform a method. A non-limiting example of the computer-implemented method includes receiving a video input. The method includes generating closed caption data from the video input, in which the closed caption data is generated based at least in part on extracting text data from an audio portion of the video input. For each given frame of the video input in which closed caption data was generated, one or more characters who are speaking in the given frame or additional audio sources are identified via facial recognition and audio tone matching. A respective text style for each given character or audio source that uniquely identifies the given character or audio source from the one or more identified characters or audio sources is obtained. Captioning from the closed caption data for each of the one or more identified characters or audio sources in the respective text style of each of the one or more identified characters or audio sources is generated. The generated captioning is then inserted into the given frame.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
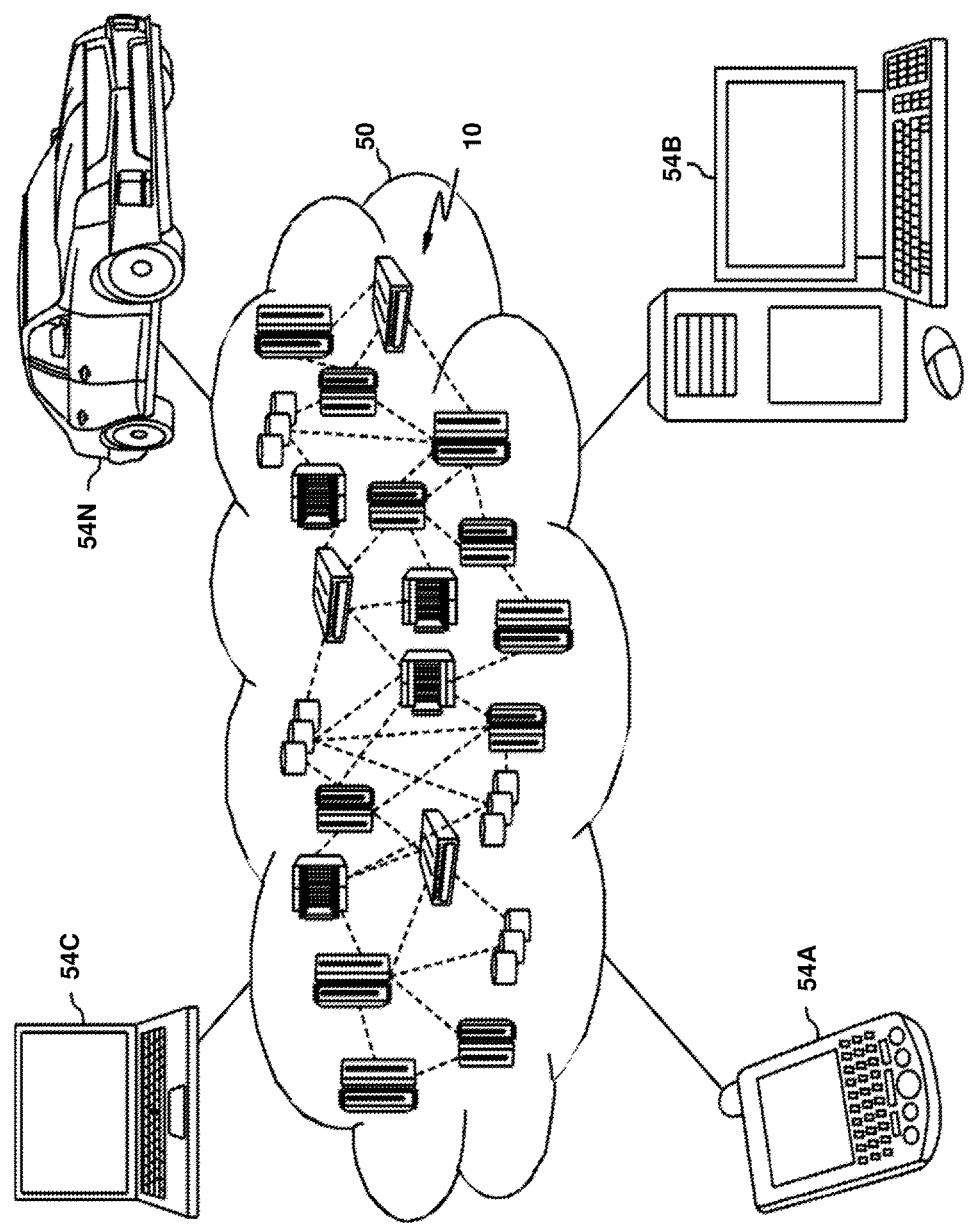
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
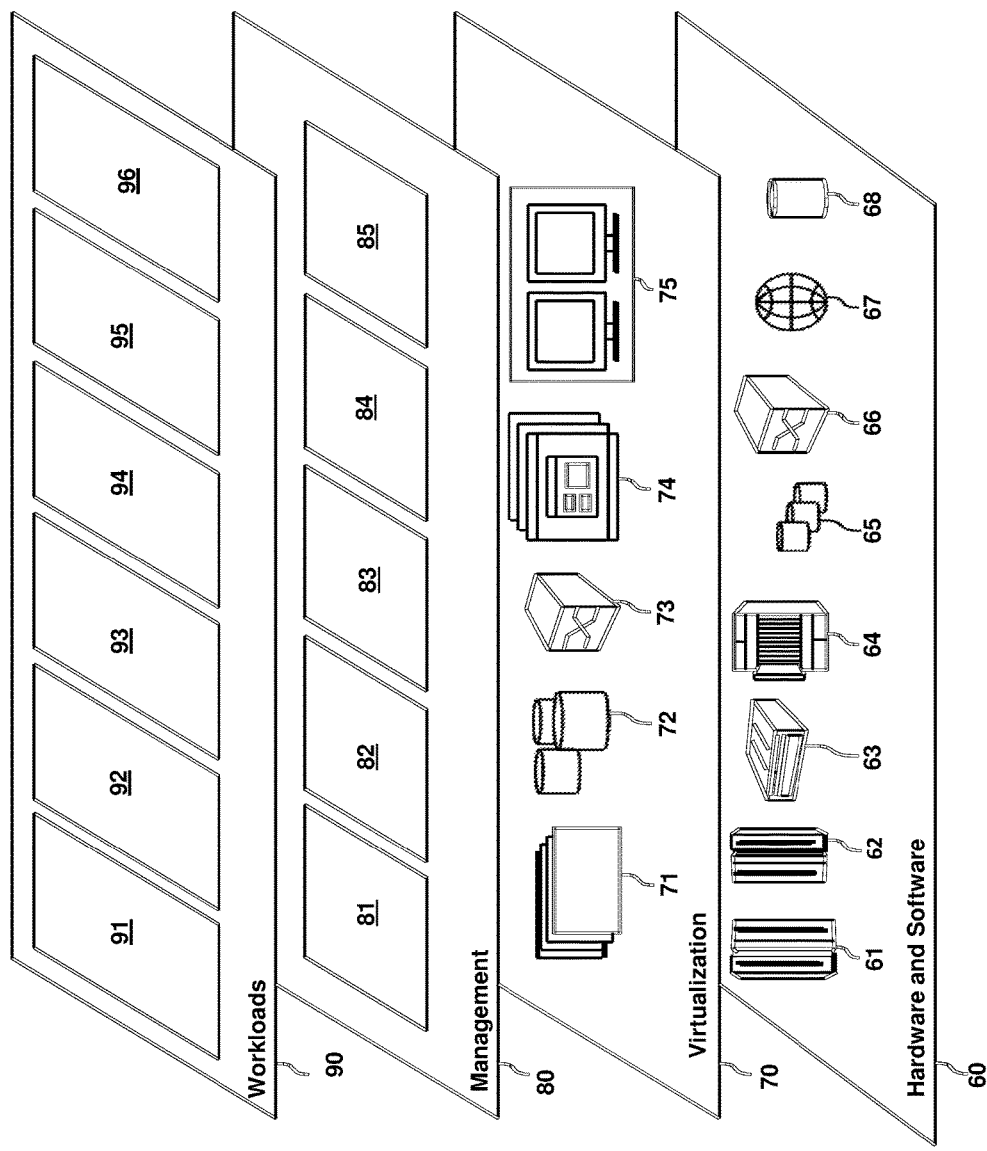
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and closed captioning processing 96.

Turning now to an overview of technologies that are more specifically relevant to aspects of the invention, some closed captioning systems receive manual text input from transcriptionists for a video and then insert subtitles into the video for viewing by users. Such systems have a variety of technical issues, such the inadvertent insertion of subtitles into a region of a video frame that overlaps important visual parts of the video or insertion of the subtitles over a background or objects that are similar in color that makes the subtitles difficult to read. Such systems do not incorporate a tone of the speaker to identify via subtitles the character who is speaking or their sentiment.

Turning now to an overview of the aspects of the invention, one or more embodiments of the invention address the above-described shortcomings of the prior art by providing a smart closed caption positioning system for video content in which the system is capable of extracting audio from a video source, converting the audio into text, modifying the visual representation of the text to improve recognition of which characters are speaking and their sentiment, and/or determining an optimal placement of the text to be overlaid onto the video such that the text overly does not interfere with important objects that a viewer wishes to see (e.g., characters, an object that a character may be referencing, a sports score, etc.), in which the important objects are identifiable via machine learning.

Figure 3:
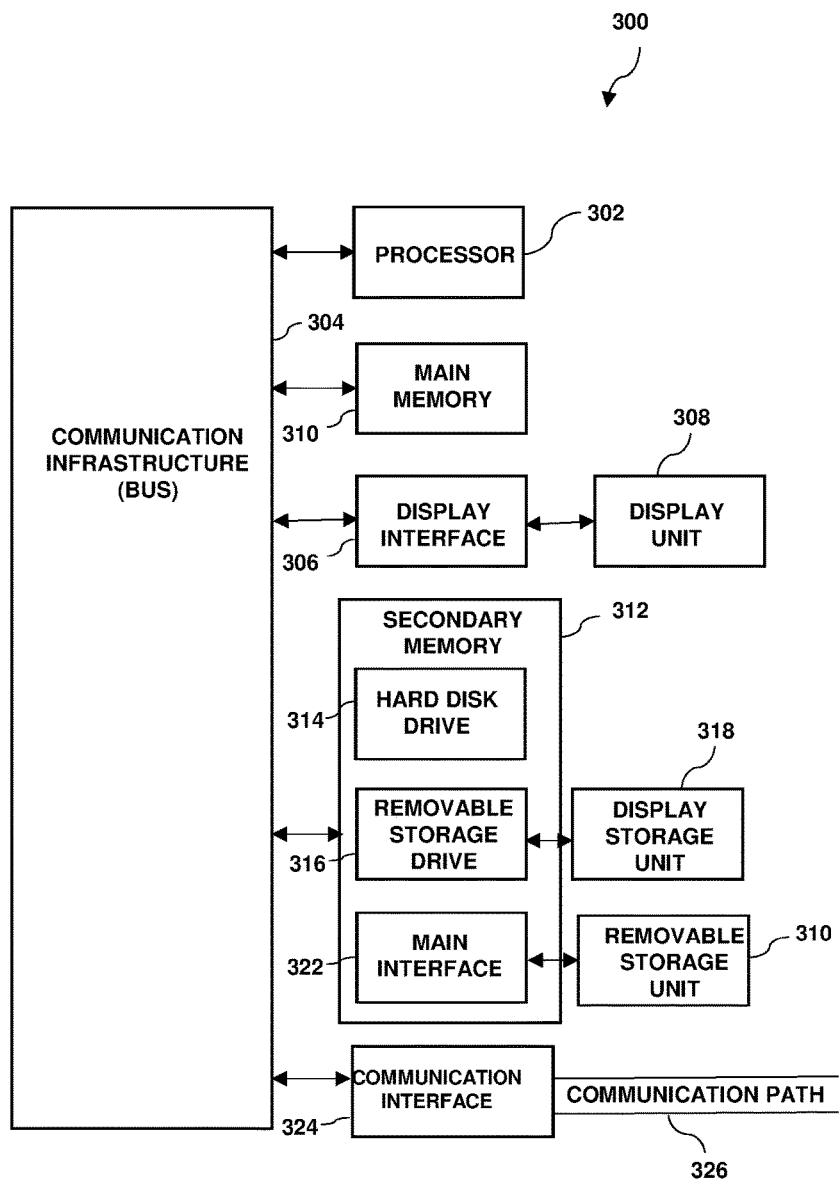
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
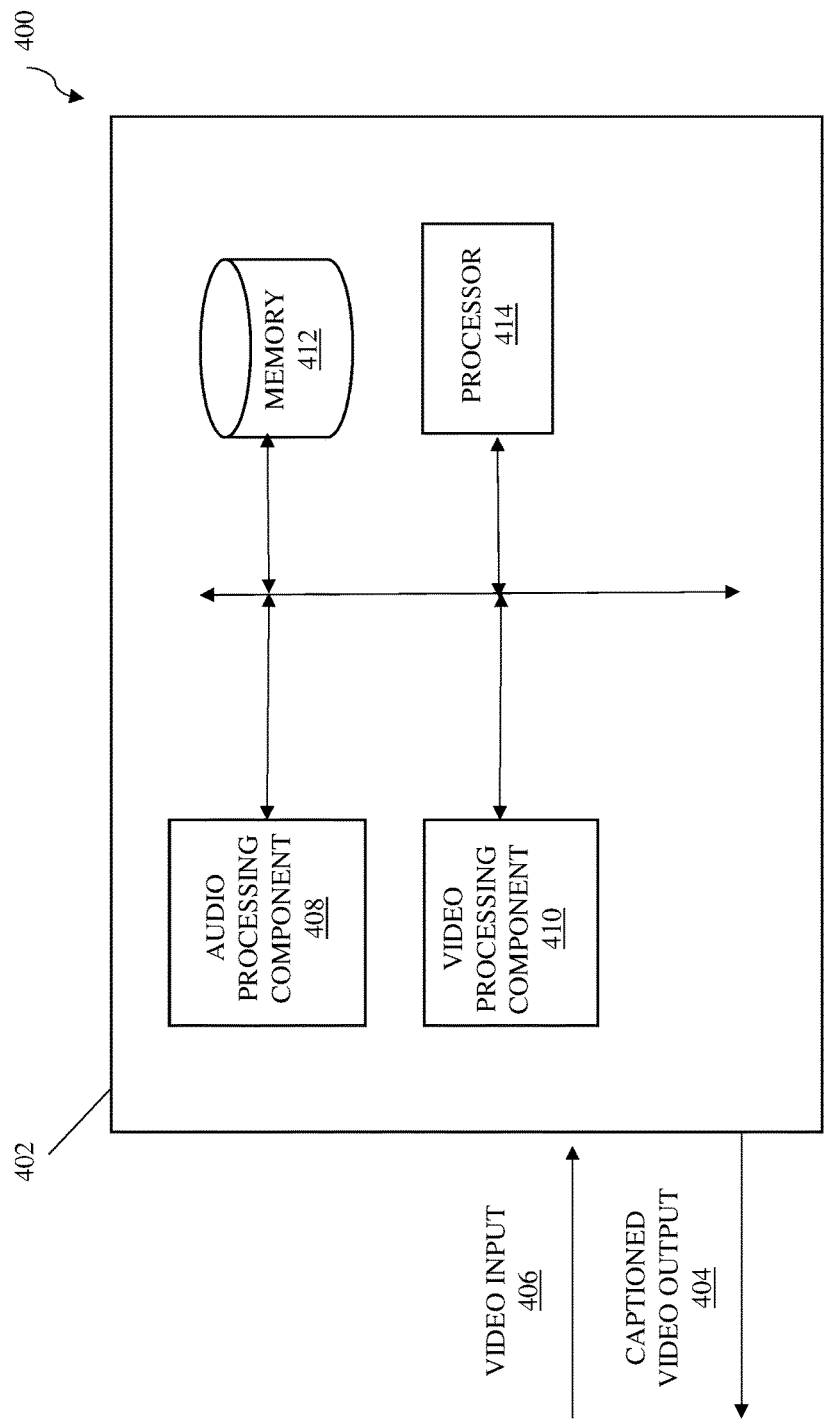
FIG. 4 depicts an exemplary system that facilitates closed captioning generation via machine learning in accordance with one or more embodiments of the present invention.

FIG. 4 depicts an example computer system 400 that is capable of implementing one or more embodiments of the present invention. System 400 is a machine learning system that can be utilized to solve a variety of technical issues (e.g., learning previously unknown functional relationships) in connection with technologies such as, but not limited to, machine learning technologies, video processing technologies, closed caption generation technologies, data analytics technologies, data classification technologies, data clustering technologies, recommendation system technologies, signal processing technologies, and/or other digital technologies. System 400 employs hardware and/or software to solve problems that are highly technical in nature, that are not abstract and that cannot be performed as a set of mental acts by a human.

In certain embodiments of the invention, some or all of the processes performed by system 400 are performed by one or more specialized computers (e.g., one or more specialized processing units, the specialized computer with text data component, etc.) for carrying out defined tasks related to machine learning. In some embodiments of the invention, system 400 and/or components of the system are employed to solve new problems that arise through advancements in technologies mentioned above.

In general, closed captioning component 402 is a cognitive-based tool that, in certain embodiments of the present invention, applies one or more machine learning models and/or engines to extract audio from a video source, convert the audio into text, modify a visual representation of the text to improve recognition of which characters are speaking, the sentiment of the what the character is saying, and/or to determine an optimal placement of closed caption text overlays such that the text overlays do not interfere with important objects and/or characters that are found in the video.

In the example shown in FIG. 4, system 400 includes a closed captioning component 402 that is capable of generating closed captions with optimal positioning and audio source output styles. The closed captioning component 402 is configured to generate a captioned video output 404 from a received video input 406. The closed captioning component 402 includes an audio processing component 408 and a video processing component 410, in which the audio processing component 408 is configured to analyze an audio portion of the received video input 406, and in which the video processing component 410 is configured to analyze frames of the received video input 406. In some embodiments of the present invention, video is processed by the closed captioning component 402 via one or more video and/or audio cognitive extraction engines that execute one or more or more machine learning techniques, models and/or APIs via a machine learning service, such as for example, through the use of IBM Watson®. In some embodiments of the present invention, the processing of the received video input 406 via closed captioning component 402 is able to identify key characters of the audio sources and to modify the text representation of closed captioning that is to be displayed on a screen. The audio of the received video input 406 is processed such that captions are created with character specific modified font styles. The characteristics of the font style could be unique to the character, and may be visually associated with the character through font color or other styling. The font styling may also convey the sentiment of the statement made by the character. In some embodiments of the present invention, the received video input 406 is analyzed via one or more machine learning algorithms to determine what important objects exist in a given frame and/or to determine an optimal placement for captions in the given frame such that the captions do not interfere with the important objects.

Machine learning is often employed by numerous technologies to determine inferences and/or relationships among digital data. For example, machine learning technologies, signal processing technologies, image processing technologies, data analysis technologies and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the invention, closed captioning component 402 constitutes machine-executable component(s) embodied within machine(s) (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, closed captioning component 402 includes a memory 412 that stores computer executable components and instructions. Furthermore, closed captioning component 402 in some embodiments of the invention includes a processor 414 to facilitate execution of the instructions (e.g., computer executable components and corresponding instructions) by the closed captioning component 402. As shown, the audio processing component 408, the video processing component 410, the memory 412, and/or the processor 414 are electrically and/or communicatively coupled to one another in one or more embodiments of the invention.

In some embodiments of the present invention, the closed captioning component 402 processes a machine learning model based on features that are extracted from the audio and/or video portions of the received video input 406 (e.g., via audio processing component 408, video processing component 410, and/or processor 414). In certain embodiments of the invention, the closed captioning component 402 employs parallel computing to process portions of the received video input 406. For instance, in some embodiments of the invention, the closed captioning component 402 performs parallel computing associated with two or more processors that process one or more portions of the received video input 406 in parallel. In one example, the closed captioning component 402 executes a classification machine learning model using the features extracted from the received video input 406 to identify important objects, optimal placements, and/or text styles. In some embodiments of the present invention, the classification machine learning model maps extracted features of the received video input 406 to one or more categories. In another example, the closed captioning component 402 executes a regression machine learning model using the features extracted from the received video input 406. In some embodiments of the present invention, a regression machine learning model is used to determine relationships among audio or video features of the received video input 406 in parallel. In yet another example, the closed captioning component 402 executes a clustering machine learning model using a feature matrix that is populated based at least in part on the features that are extracted from the received video input 406. In some embodiments of the invention, the clustering machine learning model is a machine learning model that groups related data from the received video input 406 into a corresponding group using a grouping technique such as, for example, a nearest neighbor's technique.

As noted above, the closed captioning component 402 is configured to receive a video input 406 and to generate closed caption data from the received video input 406. Various suitable types of video input may be received in various different types of suitable formats, such as for example, Moving Pictures Expert Group 4 (MP4) format, Audio Video Interleave (AVI) format, Flash Video Format (FLV) format, and Windows Media Video (WMV). In some embodiments of the present invention, the video includes one or more scenes that are found in a plurality of frames of the received video input 406. In some embodiments of the present invention, one or more frames of the received video input 406 includes one or more objects and/or one or more characters. For example, a frame may include an image of two people speaking to each other in front of a monument. In that example, the monument is a visual object and the people are speaker characters found in the frame. The phrase "characters" as used herein refers to any person or animal that is found within at least one of the audio portion or the video portion of the received video input 406. In some embodiments of the present invention, a character found in the video may be a narrator who is heard in one or more audio portions of the video but may or may not be seen in any given frame of the video. In some embodiments of the present invention, the received video input includes one or more movies, films, television shows, or other suitable types of visual recordings. The video input 406 may be a video that is being captured in real-time or a prior recorded video. In some embodiments of the present invention, the video includes animated characters and/or other visual objects.

The closed captioning component 402 is configured to generate closed caption data. In some embodiments of the present invention, the closed caption data is generated based at least in part on extracting text data from an audio portion of the received video input 406 (e.g., via audio processing component 408). In some embodiments of the present invention, the text data includes spoken words or other sounds that are extracted from the audio portion of the received video input 406. In some embodiments of the present invention, the text data is extracted via a speech-to-text technique such as via a speech-to-text API. One example suitable API is the Speech to Text API provided by IBM® Watson™. Other suitable types of speech-to-text algorithms or APIs may be used that allow for speech-to-text translation of audio data.

The closed captioning component 402 is configured to analyze the audio data and/or the extracted text to determine the nature of a conversation that is captured within the received video input 406 (e.g., within the audio and/or video portions of received video input 406). For example, in some embodiments of the present invention, this determination includes analyzing the text data to extract one or more of a tone of spoken words, sentiment, mood, and/or intensity of one or more speakers. In some embodiments of the present invention, the determination is achieved by application of one or more machine learning algorithms or APIs. Some suitable non-limiting examples of the machine learning algorithms or APIs that can be used within the context of one or more embodiments of the present invention include Natural Language Understanding API, Tone Analyzer API, Visual Recognition API and/or Natural Language Classifier API provided by IBM® Watson™. Other suitable cognitive based algorithms or techniques may be used such that a nature of a conversation found in video input may be ascertained. In some embodiments of the present invention, closed caption data that is generated by closed captioning component 402 includes extracted text and at least one of tone, sentiment, mood, and/or intensity information. Some examples of non-speech audio that can be converted into closed caption text include animal sounds, background noise, or music.

The closed captioning component 402 is configured to process frames of the reviewed video on a frame-by-frame basis to identify frames having spoken dialog and/or audio that is to be converted into a closed captions. For example, in some embodiments of the present invention, closed captioning component 402 is configured to match the extracted text to frames of the video that are associated with the generated closed caption data (e.g., extracted text). This may include associating a timestamp of the audio portion of the received video input 406 with a timestamp of a current frame of the video input.

In some embodiments of the present invention, the closed captioning component 402 is configured to determine which characters are speaking within a current frame. For example, in some embodiments of the present invention, the closed captioning component 402 is configured to determine, starting from a first frame of the received video, whether closed caption data exists for the current frame at the corresponding timestamp. If there is no audio for the current frame, then a subsequent frame of the video is processed. In some embodiments of the present invention, a frame counter is incremented if the closed caption data does not exist for the current frame at the corresponding timestamp.

In some embodiments of the present invention, if the closed captioning component 402 determines that a current frame has closed caption data that is associated with the current frame (e.g., extracted text), and then a visual recognition process is performed to identify objects in the current frame. Various suitable visual recognition APIs and algorithms may be used such as, for example, Natural Language Understanding API and Visual Recognition API provided by IBM® Watson™.

For each given frame of the received video that has closed caption data associated, one or more characters are who are speaking in the given frame are identified by the closed captioning component 402. In some embodiments of the present invention, the one or more characters who are speaking in the frame are identified via a combination of facial recognition and audio tone matching. Various suitable types of visual recognition technologies and audio matching technologies may be used to identify speaking characters, such as for example, the Visual Recognition API and/or Tone Analyzer API provided by IBM® Watson™.

In some embodiments of the present invention, the closed captioning component 402 is configured to obtain a respective text style for each given character that was identified as speaking within the current frame. The text style is a style that is used to uniquely identify a given speaking character from all other speaking characters. In some embodiments of the present invention, the text style is obtained based on closed caption text characteristics that are fetched and/or set for characters that have been identified as speaking in the given frame. In some embodiments of the present invention, the text style that is obtained for a first character is different from a text style of other characters of the one or more identified characters. In some embodiments of the present invention, the respective text style for a given identified speaking character includes one or more of a font style, text size, bold, italic, or color that is to be used to style caption text that is associated with the given character. For example, in some embodiments of the present invention, the respective text style for a first character may include at least one of font style, text size, bold, italic, or color that is different from a font style, text size, bold, italic, or color of a second character of the one or more identified speaking characters. For example, a color of a text style of the first character may indicate that a first color should be used for closed caption text that is associated with the first character (e.g., font color, text outline, etc.) whereas a color of a text style of the second character may indicate that a second color, different from the first color is to be used for closed caption text that is associated with the second character.

After obtaining the respective text styles of each of the speaking characters, in some embodiments of the present invention captioning is then generated by the closed captioning component 402 for each of the speaking characters in their respective text styles for the given frame from the closed caption data. The generated captioning is then overlaid onto the video by inserting the captioning into the given frame at a particular position within the frame.

In some embodiments of the present invention, the closed captioning component 402 is configured to modify the text style of one or more speaking characters in the frame such that the text styles of the speaking characters reflects the tone, sentiment, mood, and/or intensity that was extracted from the audio portion of the received video input 406 that is associated. In some embodiments of the present invention, body language and facial expression in video portions of the received video input 406 are analyzed by the closed captioning component 402 (e.g., the video processing component 410) to determine and/or confirm a sentiment, intensity, tone, and/or mood of the speaking characters. For example, in some embodiments of the present invention, the text style of the given character is modified to reflect at least one tone, sentiment, mood, or intensity of the given character. One example modification may include changing at least one of a font of the text style to bold or all caps, or italics in response to the detecting a certain indication in the extracted tone, sentiment, mood, and/or intensity. For example, in some embodiments of the present invention, if an indication of anger is detected, the font of the text style is changed to all caps and/or if an indication of sarcasm is detected, the font of the text style is further or alternatively changed to italics.

In some embodiments of the present invention, the closed captioning component 402 is further or alternatively configured to determine on a frame-by-frame basis, an optimal position for the insertion of text overlays into a given frame of the video such that text overlays do not interfere with import objects or speakers of the given frame. In some embodiments of the present invention, an interference occurs when a text overlay covers one or more of the speaking characters or important objects. In regards to the extraction and identification of important objects, in some embodiments of the present invention, the closed captioning component 402 is configured to extract visual objects for each given frame of the received video using a visual recognition technology, such as for example, the Visual Recognition API provided by IBM® Watson™. Via the visual recognition technology, the closed captioning component 402 is further configured to identify one or more important objects of the extracted objects based on the application of one or more machine learning models and/or algorithms.

In some embodiments of the present invention, the closed captioning component 402 is configured to identify the one or more important objects by determining a level of importance of each of the extracted objects, and identifying one or more objects of the extracted objects that have a level of importance that is higher than an importance threshold. In some embodiments of the present invention, the importance threshold is a pre-configured value that is set prior to execution of the video processing. In some embodiments of the present invention, the importance threshold is trained and updated overtime via machine learning.

In some embodiments of the present invention, the closed captioning component 402 is configured to identify an object as being important when a character in the frame references an object that is found within one or more frames of the video. For example, in some embodiments of the present invention, if a character references an object such as a coffee mug in the audio portion of the received video input 406, the closed captioning component 402 may mark the coffee mug as being an important object if the coffee mug if found within the frames of the video. In some embodiments of the present invention, the references to objects are identified by the closed captioning component 402 via the detection of one or more tokens in the video and audio portions of the received video input 406. In some embodiments of the present invention, an object is identified as important if a speaker references a particular object more than a pre-determined amount of times.

In some embodiments of the present invention, once the important objects have been identified, the closed captioning component 402 identifies an optimal placement position for insertion of closed caption text into the current frame by comparing visual data of the current given frame to visual data of a previous frame to determine a degree of visual similarity. Upon the degree of visual similarity between the given frame and the prior frame being below a visual similarity threshold, one or more potential text insertion areas that do not overlap with the important objects and/or speakers are identified by the closed captioning component 402. If the comparison of the current frame to the previous frame results in a degree of visual similarity that is below a visual similarity threshold, such an occurrence may be indicative of a significant change in one or more elements of the video. For example, if the background of the frame changes significantly between frames of the video, the change may be indicative that a scene of the video has changed, and thus the area used to overlay captions in a previous frame is not a likely optimal location for text overlay in the current frame.

In some embodiments of the present invention, when the degree of visual similarity between the given frame and the prior frame is below the visual similarity threshold, potential text insertion areas are identified that do not overlap with the identified speaking characters and/or the identified important objects. The closed captioning component 402 then selects an optimal area from the one or more potential areas for the insertion of closed caption text into the current frame. In some embodiments of the present invention, multiple locations are selected as optimal locations when closed caption data for different characters is to be displayed in separate areas of the current frame (e.g., speech bubbles).

In some embodiments of the present invention, one or more colors of the background of the current frame are taken into consideration in the selection of an optimal location such that closed caption text that is to be inserted in the modified text style does not blend into the background. For example, in some embodiments of the present invention, text may be outlined in a color that is different from the font color if the text will span across complex background having multiple background colors or if the text will span across a background or object of similar color to the caption text. In some embodiments of the present invention, the optimal location of caption text for a character that is not visually within the frame may be placed towards the right or left hand side of the frame to indicate the character's location relative to the scene. For example, if a character who is speaking is not found within a current frame and if the character is found in one or more subsequent frames on the right hand side of the frame, then the closed caption text associated with the character will be inserted into a right hand portion of the current frame in some embodiments of the present invention.

In some embodiments of the present invention, the optimal area selected by the closed captioning component 402 is the area of the potential areas that is positioned closest to a text insertion location of a previous frame. For example, if a prior frame includes a text overlay on the top left corner of a frame and if the potential insertion areas for the current frame includes a top middle area and a bottom right area, then the top middle area is selected as the top middle area is the closest. Once the optimal area is selected, the captioning that is generated with the modified text style is inserted into the given frame at the selected area.

In some embodiments of the present invention, upon the closed captioning component 402 detecting that the degree of visual similarity between the given frame and the previous frame is above the visual similarity threshold, captioning is then inserted into the given frame at a text insertion location that is the same as the text insertion location of the previous frame. For example, if the current and prior frame display two characters who are sitting down having a conversation, the visual similarity between the two frames may be high; thus, indicating that significant visual change between the two frames has not occurred. In a further example, if a prior frame included a text overlay on the top left corner of a frame, and if the degree of visual similarity is above the visual similarity threshold, then the top left corner of the current frame is selected for overlaying captioning text onto the current frame as that is the area that was used in the prior frame. In some embodiments of the present invention, the visual similarity threshold is a pre-configured value that is set prior to execution of the video processing. In some embodiments of the present invention, the visual similarity threshold is trained and updated over time via machine learning.

In some embodiments of the present invention, the comparing of the visual data between the given frame and the previous frame includes detecting movement of one or more identified speaking characters and/or one or more important objects via motion vectors. In some embodiments of the present invention, motion vectors are established across a plurality of frames for a given scene of the received video. In some embodiments of the present invention, the comparing of the video data is performed via pixel by pixel comparison.

In some embodiments of the present invention, the text insertion location for a text overlay of a current frame is based on a comparison of visual data of the current frame with a subsequent frame. For example, if an object is identified via motion vectors as moving from a first position in the current frame to a second position in the second frame, then in some embodiments of the present invention, the text overlay position of the current frame is selected such that the text overlay does not overlap with the second position. For example, if a first character is kicking a ball to a second character in the video, in which the first character is positioned on a left middle side of the frame and the second character is positioned on a right middle side of the frame, then upon the closed captioning component 402 detecting a motion vector of the ball as moving from the left hand side to the right, the closed captioning component 402 may select a position in the current frame that is not the left middle side nor the right middle side of the current frame as the motion vector established that the ball will be moving from the left middle position of the current frame to the right middle position of a subsequent frame.

Figure 5:
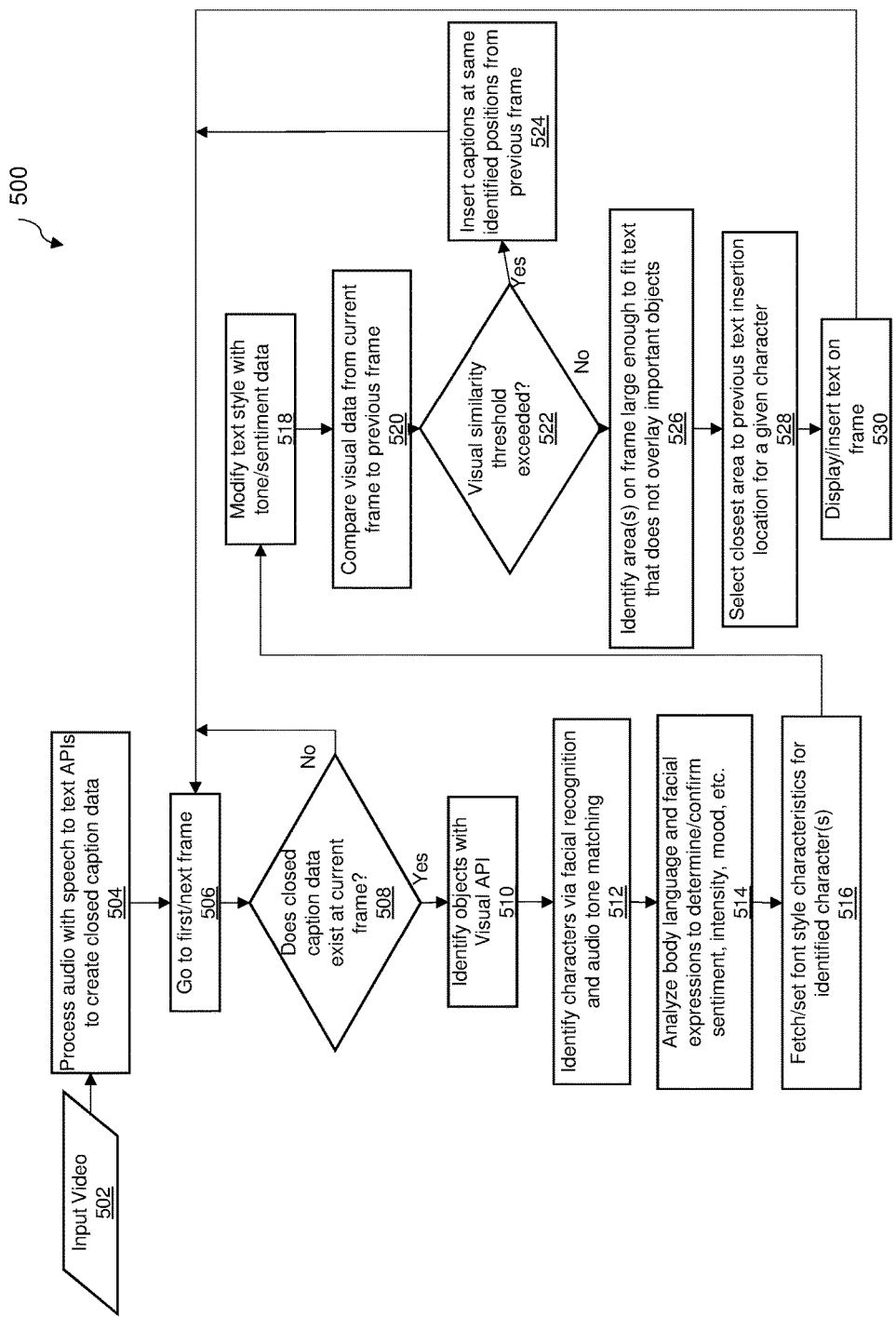
FIG. 5 depicts an example process flow that can be implemented by the system of FIG. 4 in accordance with one or more embodiments the present disclosure.

FIG. 5 depicts one example of a process flow 500 that can be implemented by system 400 of FIG. 4 in accordance with one or more embodiments of the present invention. The process flow 500 describes the performance of steps in a manner similar to the functions identified above in regards to FIG. 4. As shown in FIG. 5, the example process flow 500. At 502, the input video is received. At 504, audio is processed via one or more speech to text APIs to create closed caption data. At 506, a first frame or subsequent frame of the received video is selected. At 506, a determination is made as to if closed caption data exists or was created for the current frame. If the closed caption data exists for the current frame, then objects within the current frame are identified at 510 via a visual recognition API. If the closed caption data does not exist for the current frame, the process returns to step 506 and a frame counter is incremented. The counter keeps track of how many frames have been processed.

At 512, characters who are speaking within the current frame of the video are identified via facial recognition and audio tone matching. At 514, body language and facial expression are analyzed to determine and/or confirm sentiment, intensity, mood, or tone of one or more of the identified characters. At 516, text style characteristics and/or properties, such as font, are fetched and/or set for the identified characters. At 518, the text style of the identified characters is modified based on tone, sentiment, intensity, and/or mood data. At 520 visual data of the current frame is compared to visual data of a previous frame. At 522 it is determined whether the comparison of the visual data exceeds a visual similarity threshold. At 524, if the visual similarity threshold is exceeded, then captions are inserted in the current frame at the same identified positions as that of a previous frame. At 526, if the visual similarity threshold is not extended, then one or more areas are identified on the current frame that are large enough to fit text that does not overlay important objects. At 528, the closest area to a previous text insertion location for a given character is selected. At 530, the captioning text is inserted into the current frame and the process increments the frame counter by one and returns the process to step 506 if the number of processed frames is less than the total amount of frames of the video.

Figure 6:
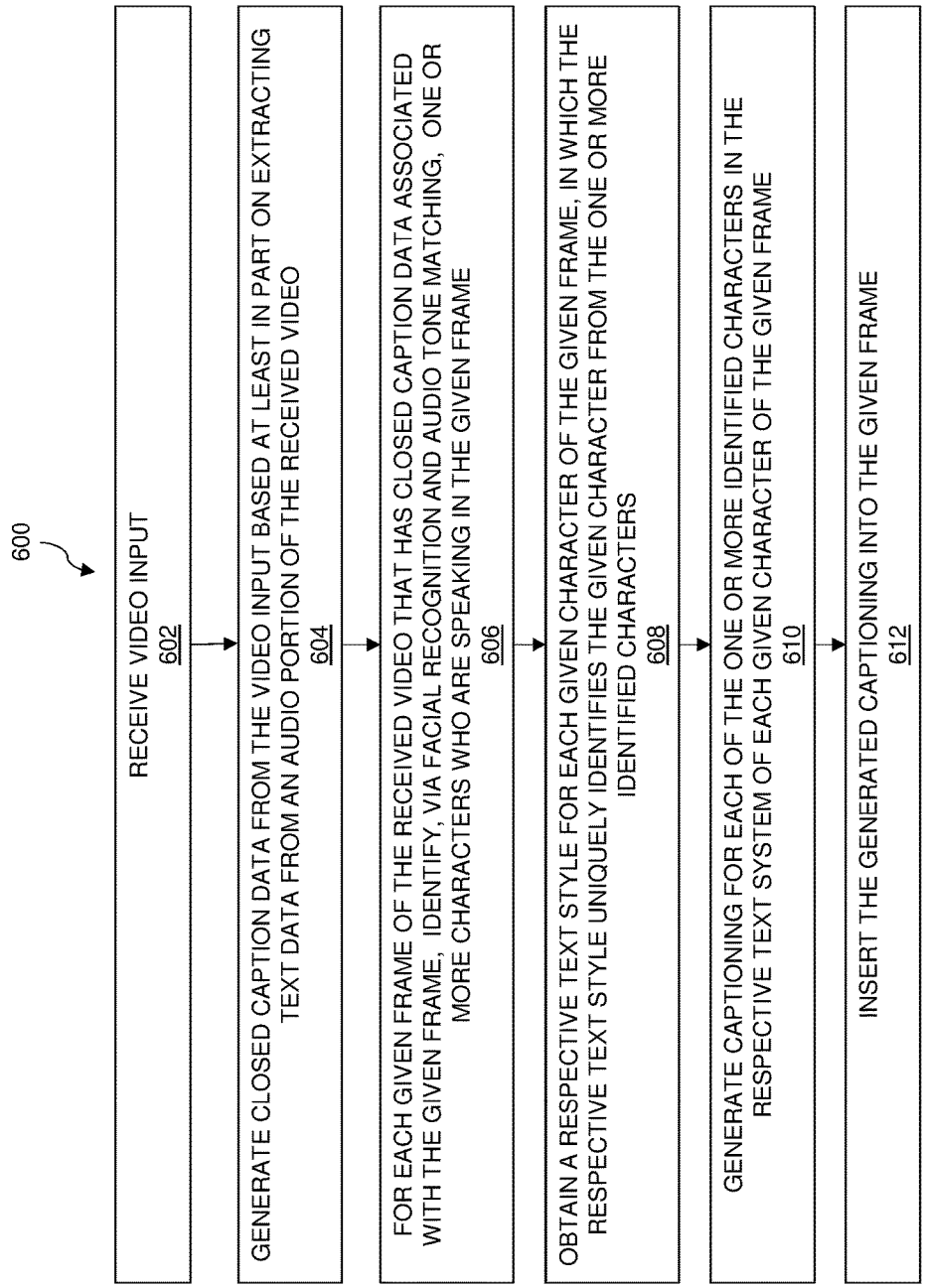
FIG. 6 depicts a flow diagram illustrating an example methodology in accordance with one or more embodiments of the present invention.

Additional details of the operation of system 400 will now be described with reference to FIG. 6, wherein FIG. 6 depicts a flow diagram illustrating a methodology 600 according to one or more embodiments of the present invention. At 602, a video input is received. At 604, closed caption data is generated from the video input based at least in part on extracting text data from an audio portion of the received video. At 606, for each given frame of the received video that has closed caption data associated with the given frame, one or more characters who are speaking in the given frame are identified via facial recognition and audio tone matching. At 608, a respective text style for each given character is obtained for the given frame, in which the respective text style of the given character uniquely identifies the given character from the one or more identified characters. At 610, captioning from the closed caption data is generated for each of the one or more identified characters in the respective text styles of each of the one or more identified characters. At 612, the generated captioning is inserted into the given frame.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating closed captions via optimal positioning and character specific output styles, the method comprising:
   receiving, by a system comprising one more processors, a video input;
   generating, by the system, closed caption data from the video input based at least in part on extracting text data from an audio portion of the video input; and
   for each given frame of the video input that has closed caption data associated with the given frame:
      identifying, by the system via facial recognition and audio tone matching, one or more characters who are speaking within the given frame;
      obtaining, by the system, a respective text style for each given character that uniquely identifies the given character from the one or more identified characters;
      generating, by the system, captioning from the closed caption data for each of the one or more identified characters in the respective text style of each of the one or more identified characters;

extracting, by the system, visual objects from the given frame of the video input;

determining, by the system, a level of importance of each of the extracted objects of the given frame to video content of the video input to identify one or more important objects of the extracted objects having a level of importance that is higher than an importance threshold, wherein the level of importance of each of the extracted objects is established based at least in part on application of one or more machine learning algorithms;

comparing visual data of the given frame with visual data of a previous frame to determine a degree of visual similarity; and upon the degree of visual similarity between the given frame and the previous frame being below a visual similarity threshold, identifying one or more areas of the given frame that do not overlap with the identified one or more characters and the identified one or more important objects, selecting an area of the one or more areas that is positioned at a text insertion location that is close to a text insertion location of the previous frame, inserting, by the system, the generated captioning into the given frame within the selected area.

2. The computer-implemented method of claim 1, wherein the respective text style for a first character of the one or more identified characters comprises at least one of a font style, text size, bold, italic, or color, wherein the respective text style for a second character of the one or more identified characters comprises at least one of a font style, text size, bold, italic, or color that is different from the respective text style of the first character.

3. The computer-implemented method of claim 1, wherein generating the closed caption data includes extracting at least one of a tone, sentiment, mood, or intensity of the given character from the audio portion of the video input, and wherein the computer-implemented method further includes:

modifying the respective text style of the given character to reflect the at least one tone, sentiment, mood, or intensity of the given character; and generating captioning from the closed caption data for the given identified character in the modified text style of the given character.

4. The computer-implemented method of claim 3, wherein modifying the text style of the given character to reflect the at least one tone, sentiment, mood, or intensity of the given character includes changing at least one of a font of the text style to bold, all caps, or italics upon an extracted sentiment being an indication of anger or sarcasm.

5. The computer-implement method of claim 1, further comprising upon the degree of visual similarity between the given frame and the previous frame being above the visual similarity threshold, inserting the generated captioning with the modified text style into the given frame at a text insertion location of the given frame that is the same as the text insertion location of the previous frame.

6. The computer-implement method of claim 1, wherein comparing the visual data includes detecting movement of the one or more identified characters and the identified one or more important objects based on motion vectors, wherein the motion vectors are established across a plurality of frames of a given scene of the video input.

7. A system for generating closed captions via optimal positioning and character specific output styles, the system comprising one or more processors configured to perform a method comprising:

receiving, by the system, a video input;

generating, by the system, closed caption data from the video input based at least in part on extracting text data from an audio portion of the video input; and for each given frame of the video input that has closed caption data associated with the given frame:

identifying, by the system via facial recognition and audio tone matching, one or more characters who are speaking within the given frame;

obtaining, by the system, a respective text style for each given character that uniquely identifies the given character from the one or more identified characters;

generating, by the system, captioning from the closed caption data for each of the one or more identified characters in the respective text style of each of the one or more identified characters;

extracting, by the system, visual objects from the given frame of the video input;

determining, by the system, a level of importance of each of the extracted objects of the given frame to video content of the video input to identify one or more important objects of the extracted objects having a level of importance that is higher than an importance threshold, wherein the level of importance of each of the extracted objects is established based at least in part on application of one or more machine learning algorithms;

comparing visual data of the given frame with visual data of a previous frame to determine a degree of visual similarity; and upon the degree of visual similarity between the given frame and the previous frame being below a visual similarity threshold, identifying one or more areas of the given frame that do not overlap with the identified one or more characters and the identified one or more important objects, selecting an area of the one or more areas that is positioned at a text insertion location that is close to a text insertion location of the previous frame, inserting, by the system, the generated captioning into the given frame within the selected area.

8. The system of claim 7, wherein the respective text style for a first character of the one or more identified characters comprises at least one of a font style, text size, bold, italic, or color, wherein the respective text style for a second character of the one or more identified characters comprises at least one of a font style, text size, bold, italic, or color that is different from the respective text style of the first character.

9. The system of claim 7, wherein generating the closed caption data includes extracting at least one of a tone, sentiment, mood, or intensity of the given character from the audio portion of the video input, and wherein the method further includes:

modifying the respective text style of the given character to reflect the at least one tone, sentiment, mood, or intensity of the given character; and generating captioning from the closed caption data for the given identified character in the modified text style of the given character.

10. The system of claim 9, wherein modifying the text style of the given character to reflect the at least one tone, sentiment, mood, or intensity of the given characters includes changing at least one of a font of the text style to bold, all caps, or italics upon an extracted sentiment being an indication of anger or sarcasm.

11. The system of claim 7, wherein the method further includes:
   upon the degree of visual similarity between the given frame and the previous frame above the visual similarity threshold, inserting the generated captioning with the modified text style into the given frame at a text insertion location of the given frame that is the same as the text insertion location of the previous frame.

12. The system of claim 7, wherein comparing the visual data includes detecting movement of the one or more identified characters and the identified one or more important objects based on motion vectors, wherein the motion vectors are established across a plurality of frames of a given scene of the video input.

13. A non-transitory computer program product for generating closed captions via optimal positioning and character specific output styles, the computer program product comprising a computer readable storage medium having program instructions embodied therewith, the program instructions executable by a system comprising one or more processors to cause the system to perform a method comprising:
   receiving, by the system, a video input;
   generating, by the system, closed caption data from the video input based at least in part on extracting text data from an audio portion of the video input; and
   for each given frame of the video input that has closed caption data associated with the given frame:
      identifying, by the system via facial recognition and audio tone matching, one or more characters who are speaking within the given frame;
      obtaining, by the system, a respective text style for each given character that uniquely identifies the given character from the one or more identified characters;
      generating, by the system, captioning from the closed caption data for each of the one or more identified characters in the respective text style of each of the one or more identified characters;
      extracting, by the system, visual objects from the given frame of the video input;
      determining, by the system, a level of importance of each of the extracted objects of the given frame to video content of the video input to identify one or more important objects of the extracted objects having a level of importance that is higher than an importance threshold, wherein the level of importance of each of the extracted objects is established based at least in part on application of one or more machine learning algorithms;
      comparing visual data of the given frame with visual data of a previous frame to determine a degree of visual similarity; and
      upon the degree of visual similarity between the given frame and the previous frame being below a visual similarity threshold, identifying one or more areas of the given frame that do not overlap with the identified one or more characters and the identified one or more important objects, selecting an area of the one or more areas that is positioned at a text insertion location that is close to a text insertion location of the previous frame, inserting, by the system, the generated captioning into the given frame within the selected area.

14. The non-transitory computer program product of claim 13, wherein the respective text style for a first character of the one or more identified characters comprises at least one of a font style, text size, bold, italic, or color, wherein the respective text style for a second character of the one or more identified characters comprises at least one of a font style, text size, bold, italic, or color that is different from the respective text style of the first character.

15. The non-transitory computer program product of claim 13, generating the closed caption data includes extracting at least one of a tone, sentiment, mood, or intensity of the given character from the audio portion of the video input, and wherein the method further includes:
   modifying the respective text style of the given character to reflect the at least one tone, sentiment, mood, or intensity of the given character; and
   generating captioning from the closed caption data for the given identified character in the modified text style of the given character.

16. The non-transitory computer program product of claim 15, wherein modifying the text style of the given character to reflect the at least one tone, sentiment, mood, or intensity of the given characters includes changing at least one of a font of the text style to bold, all caps, or italics upon an extracted sentiment being an indication of anger or sarcasm.

17. The non-transitory computer program product of claim 13, wherein comparing the visual data includes detecting movement of the one or more identified characters and the identified one or more important objects based on motion vectors, wherein the motion vectors are established across a plurality of frames of a given scene of the video input.

* * * * *